United States Patent [19]

Frigon

[11] 3,913,167

[45] Oct. 21, 1975

[54] WINDSHIELD WASHER NOZZLE DEVICE

[75] Inventor: Richard J. Frigon, Michigan City, Ind.

[73] Assignee: Sprague Devices, Inc., Michigan City, Ind.

[22] Filed: July 15, 1974

[21] Appl. No.: 488,436

[52] U.S. Cl. ............................. 15/250.04; 239/284
[51] Int. Cl.² ............................................. B60S 1/52
[58] Field of Search ...................................
15/250.01–250.04, 250.35; 239/284

[56] References Cited
UNITED STATES PATENTS

| | | | |
|---|---|---|---|
| 2,622,929 | 12/1952 | Neufeld | 15/250.01 X |
| 2,772,115 | 11/1956 | Stanley | 239/284 |
| 2,866,996 | 1/1959 | Krusche | 15/250.04 |
| 3,432,876 | 3/1969 | Edwards | 15/250.04 |
| 3,790,083 | 2/1974 | Redifer | 15/250.04 |

*Primary Examiner*—Peter Feldman
*Attorney, Agent, or Firm*—Oltsch & Knoblock

[57] ABSTRACT

A nozzle device which is adapted for use with a windshield wiper and which when connected to the wiper moves with it across the windshield depositing a cleaning fluid thereon. The nozzle device includes capped nipple parts which are adjustable to selectively direct the cleaning fluid over the windshield.

2 Claims, 6 Drawing Figures

U.S. Patent   Oct. 21, 1975   3,913,167
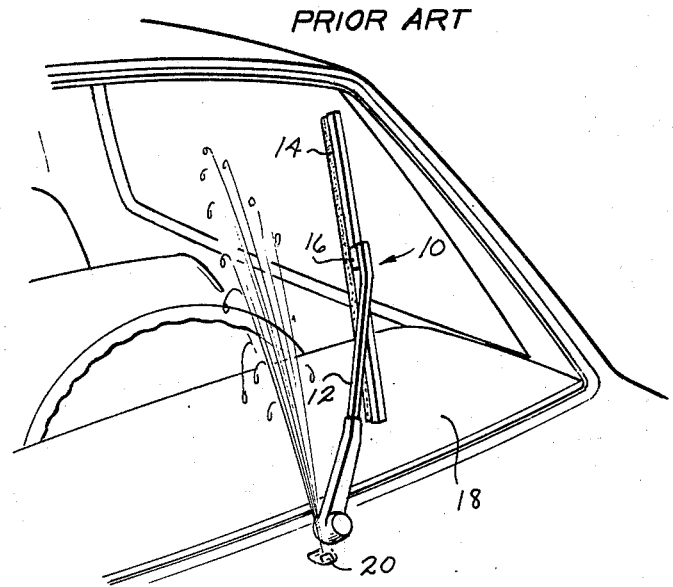
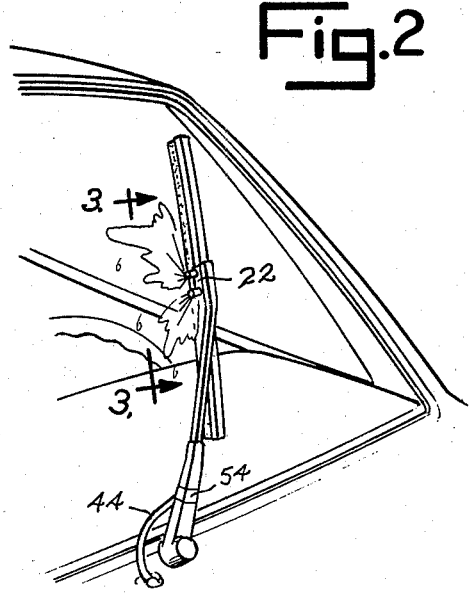
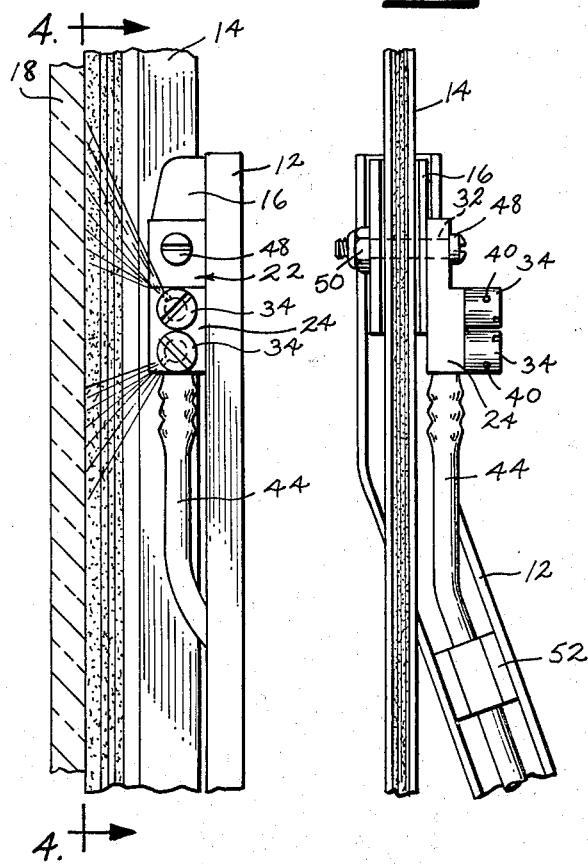

WINDSHIELD WASHER NOZZLE DEVICE

SUMMARY OF THE INVENTION

This invention relates to a windshield washer nozzle device which can be connected to a windshield wiper for the purpose of improving the windshield cleaning properties of the wiper.

The nozzle device includes a mount having a base and at least one nipple part which protrudes laterally from the base. A flow passage extends through the base and nipple part, having its inlet in the base and its outlet in the nipple part. A flexible conduit is connected to the base at its flow passage inlet and is adapted to be connected at its opposite end into flow communication with the windshield wiper fluid reservoir of the windshield cleaner system. A cap is fitted over each of the nipple parts and covers the fluid passage outlet therein. Each cap is rotatable upon its nipple part and includes an opening or directional spray orifice to permit the fluid flow through the nozzle device to be selectively directed when the nozzle device is attached to the windshield wiper. The nozzle device of this invention may be utilized as original equipment on automotive and truck vehicles as well as replacement equipment which serves to improve and modify the existing windshield washer system of a vehicle.

Accordingly, it is an object of this invention to provide a nozzle device for a windshield washer which is of economical construction and which can be installed in a rapid and simple manner.

Another object of this invention is to provide a nozzle device which is for a windshield washer and which can be installed into existing windshield washer systems so as to improve the effectiveness of the system.

Other objects of this invention will become apparent upon a reading of the invention's description.

BRIEF DESCRIPTION OF THE DRAWINGS

A preferred embodiment of this invention has been chosen for purposes of illustration and description wherein:

FIG. 1 is a perspective view of a common prior art type windshield washer system to which the nozzle device of this invention can be adapted.

FIG. 2 is a perspective view of a windshield washer system showing the nozzle device of this invention attached to the windshield wiper.

FIG. 3 is an enlarged detailed view in fragmentary form of the nozzle device of this invention as seen from line 3—3 of FIG. 2.

FIG. 4 is a view of the nozzle device as seen from line 4—4 of FIG. 3.

FIG. 5 is an isolated view of one component of the nozzle device of this invention.

FIG. 6 is a sectional view taken along line 6—6 of FIG. 5.

DESCRIPTION OF THE PREFERRED EMBODIMENT

The preferred emboiment illustrated is not intended to be exhaustive or to limit the invention to the precise form disclosed. It is chosen and described in order to best explain the principles of the invention and its application and practical use to thereby enable others skilled in the art to best utilize the invention.

The windshield wiper 10 illustrated in FIG. 1 includes an arm 12 which is connected at one end to a suitable reciprocating motion device and which is connected at its opposite end to a wiper blade 14. Blade 14 fits into a saddle clip 16 which forms a part of wiper arm 12. A rivet or screw extends through saddle clip 16 and blade 14 to secure the blade to the arm. The motion device connected to wiper arm 12 causes the arm to shift reciprocably back and forth across the vehicle windshield 18 with the blade 14 contacting the windshield outer surface. The windshield washer system of which wiper 10 forms a part includes a washer fluid reservoir which in conjunction with a pump and conduit means serves to spray a cleaning fluid upon the windshield through an exterior nozzle 20.

By means of the windshield nozzle device shown in FIGS. 3–6, the prior art windshield washer system of FIG. 1 can be converted into a more efficient system as seen in FIG. 2. In this invention a nozzle mount 22 is provided for attachment to wiper 10. Mount 22 includes a base 24 and at least one and preferably a pair of nipple parts 26. Base 24 and nipple parts 26 may be formed of an integral molded construction from a plastic type material. Nipple parts 26 preferably parallel one another and project laterally outwardly from base 24 along individual axes. A passage 28 is formed in base 24 and nipple parts 26. Passage 28 has its inlet in the base part and an outlet in each of the nipple parts. Base 24 also includes a flange 30 in which an opening 32 is formed.

A cap 34 is fitted snugly over each nozzle part 26. Each cap 34 includes a cylindrical side wall 36 which has an internal annular rib 38 formed thereon at the open end of the cap. Rib 38 of each cap 34 fits into an annular groove formed at the foot of each nozzle part 26 to cause the cap to be retained upon its nozzle part but yet permit the cap to be rotated or turned relative to the nozzle part about its axis. A small opening or spray orifice 40 is formed in each cap 34 in its side wall 36 so as to be positioned with the cap fitted over its nipple part between the end of the nipple part and the end wall of the cap. To facilitate turning of each cap relative to its nipple part, the end wall of the cap may be provided with a slot 42 to accommodate a screw driver or similar tool. A flexible conduit or tube 44 has one end connected to base 24 at the inlet of passage 28 therein. To facilitate the connection of tube 44 to base 24, the base is provided with a male fitting 46 over which the one end of the conduit is fitted.

To connect the nozzle device above described into the windshield washer system illustrated in FIG. 1, one first removes the screw or rivet which is utilized to connect blade 14 to arm 12 at saddle clip 16. With the rivet or screw removed, base 24 of mount 22 is positioned against the saddle clip 16 with a screw 48 being inserted through opening 32 in base flange 30 and the existing aligned openings in the saddle clip and blade 14. A nut 50 is then turned onto screw 48 to secure the mount 22 to wiper arm 12 and to again secure blade 14 to the wiper arm. Tube 44, which is connected to base 24, is caused to extend along the wiper arm 12. Generally wiper arms are of a channel shaped construction and are each formed so as to easily accommodate tube 44 which can be secured to inside the wiper arm by means of clips 52 and tape 54. The free end of tube 44 is fitted over existing nozzle 20 of the sprayer system in FIG. 1 so as to complete the fluid flow circuit from the cleaning fluid reservoir to nipple parts 26. If the nozzles of the older windshield washer system will not accommodate tube 44, the existing tubing which leads from the cleaning fluid reservoir to the older nozzle can be disconnected from the nozzle and reconnected by suitable coupling to the free end of the tube 44.

After mount 22 is connected to arm 12, caps 34 are rotated or turned upon nipple parts 26 to cause orifices 40 therein to be directed, as indicated by arrows 56 in FIG. 6, over the windshield 18 in order to create a wide dispersion of cleaning fluid upon actuation of the windshield washer pump. When the pump of the windshield washer system is actuated, cleaning fluid will pass from the reservoir through tube 44, passage 28 in mount 22, and out orifices 40 in caps 34 onto the windshield 18 of the vehicle where on one stroke of the windshield wiper the fluid will be dispersed and on the return stroke the wiper will cause the fluid to be swept or squeegeed from the outer surface of the windshield, causing the cleaning thereof. It is preferable to secure mount 22 to the "down" side of the windshield wiper when the wiper is in its normal stopped or parked position. With mount 22 so located on the down side of the windshield wiper, the windshield will be assured to be wiped clean of all fluid when the wiper is stopped.

It is to be understood that the precise configuration of base 24 may vary from model to model of the windshield wiper arm and blade. Additionally, it may be desirable to construct caps 34 with more than one orifice 40 each therein, depending upon the type of windshield spray configuration desired. It is to be further understood that the invention is not to be limited to the details above given but may be modified within the scope of the appended claims.

What I claim is:

1. A windshield washer and nozzle device adapted for use with a windshield wiper, said windshield wiper including a wiper arm and a wiper blade connected to said wiper arm in contact with said winshield, said wiper arm being reciprocably shiftable over said winshield with said wiper blade moving across the surface of the windshield, said washer and nozzle device comprising a mount having a base and a pair of nipple parts, said nipple parts projecting outwardly from said base in a common direction and along parallel axes, flow passage means extending through said base and nipple parts and having an inlet in the base and an outlet in each nipple part, a flexible conduit having its one end connected to said base at said flow passage means inlet and having its other end adapted for connection into a fluid flow system from a windshield washer fluid reservoir, each nipple part including an end edge and having an annular groove formed about it spaced from its end edge, a cap fitted over each nipple part end edge and covering the flow passage means outlet in the connecting nipple part, each cap including an inturned rib means fitted within the annular groove in its connecting nipple part wherein each cap is rotatable relative to its connecting nipple part about the axis thereof, directional spray orifice means in each cap in flow communication with the fluid passage means outlet in its connecting nipple part, said base including means wherein said mount is securable to said wiper for movement with said wiper blade, each cap rib means and nipple part annular groove constituting means allowing turning of each cap relative to its connecting nipple part to selectively direct fluid flow through said spray orifice means against said windshield.

2. The nozzle device of claim 1 in which said base means for securing said mount to said wiper includes an opening in said base and a screw type securement means extending through said opening, said securement means for securing said wiper blade to said wiper arm.

* * * * *